United States Patent [19]

Ozawa

[11] 4,268,854
[45] May 19, 1981

[54] SYSTEM FOR TRANSMITTING CARRIER CHROMINANCE SIGNALS OF COLOR VIDEO SIGNALS

[75] Inventor: Keiji Ozawa, Yamato, Japan

[73] Assignee: Victor Company of Japan, Ltd., Yokohama, Japan

[21] Appl. No.: 44,049

[22] Filed: May 31, 1979

[30] Foreign Application Priority Data

Jun. 1, 1978 [JP] Japan .................................. 53-64898

[51] Int. Cl.³ .......................................... H04N 9/12
[52] U.S. Cl. ........................................ 358/27; 358/35
[58] Field of Search ............................ 358/4, 8, 27, 35; 360/33

[56] References Cited

U.S. PATENT DOCUMENTS 3,708,613  1/1973  Nakabe .................................. 358/27
4,041,526  8/1977  Kaneko .................................. 358/27

FOREIGN PATENT DOCUMENTS 1003948  1/1977  Canada .................................. 358/27
2644465  4/1977  Fed. Rep. of Germany ........ 358/27

Primary Examiner—Jin F. Ng

[57] ABSTRACT

A system for transmitting carrier chrominance signals of color video signals has a maximum transmissible optimum level. A detection circuit responds to the level of the carrier chrominance signal comprising a carrier chrominance signal component and a color burst signal of a color video signal to generate a level control signal. A level control circuit responds to the level control signal, so that the peak value of the carrier chrominance signal becomes a value which is always substantially equal to the transmissible optimum level of the signal transmission system, and sends out the level controlled carrier chrominance signal to the signal transmission system.

6 Claims, 7 Drawing Figures

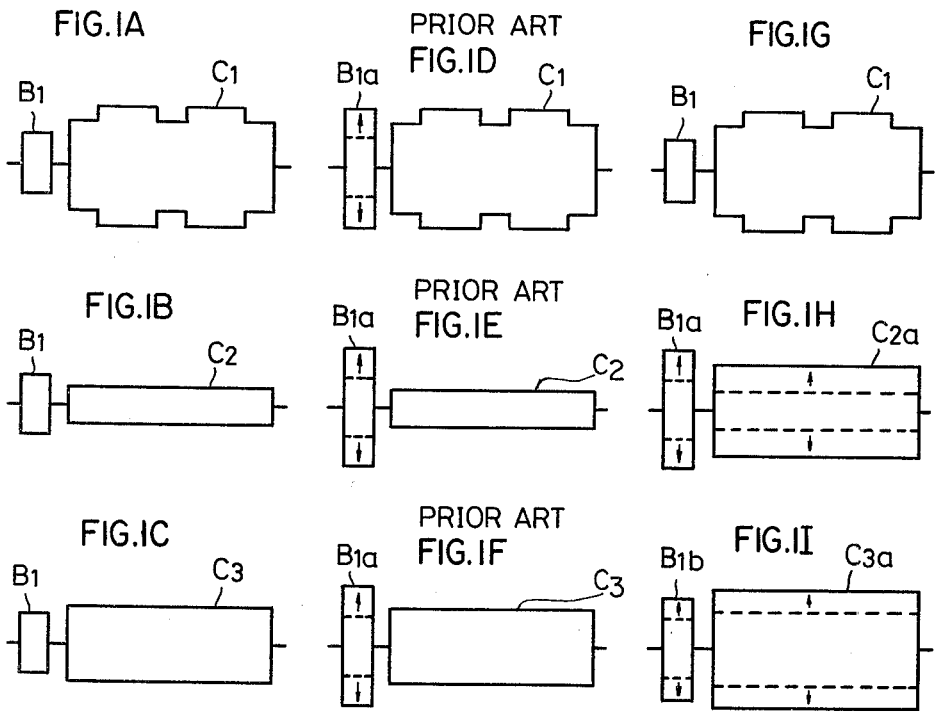
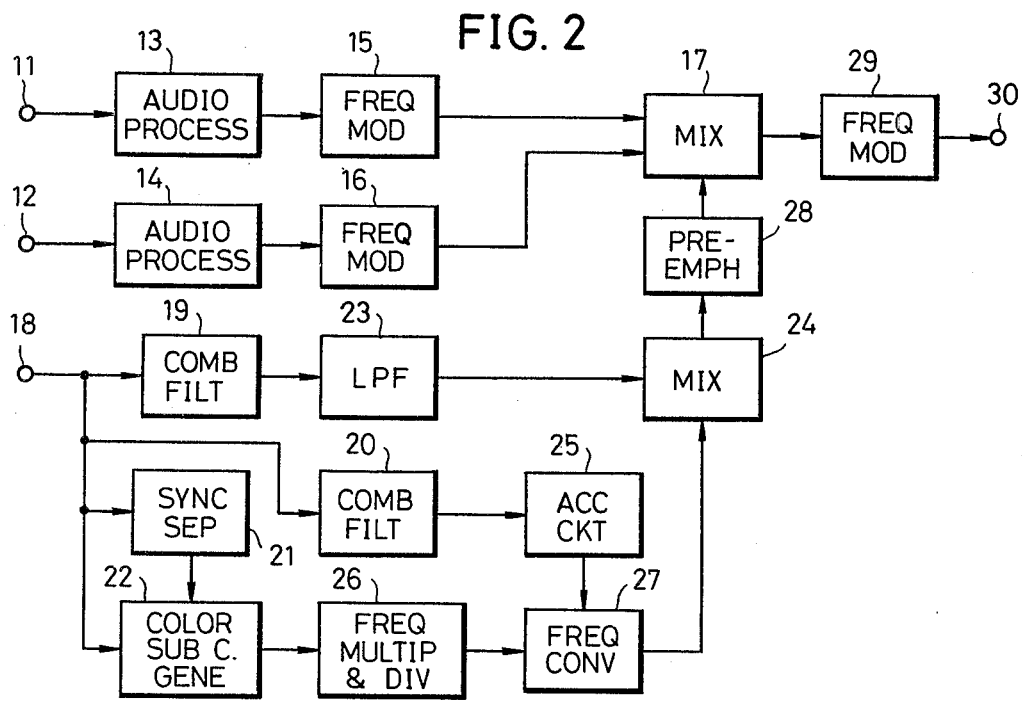

SYSTEM FOR TRANSMITTING CARRIER CHROMINANCE SIGNALS OF COLOR VIDEO SIGNALS

BACKGROUND OF THE INVENTION

The present invention relates generally to systems for transmitting carrier chrominance signals of color video signals, and more particularly to systems capable of transmitting, with a good S/N ratio, carrier chrominance signals of color video signals in which there is a limit to the carrier chrominance signal transmission level.

In general, a signal transmission system for recording and reproducing color video signals on and from a recording medium such as a magnetic tape or a rotary disc, has a limit for the transmissible level of the carrier chrominance signal. For example, in an apparatus for recording and reproducing a color video signal on and from a magnetic tape, use is made of a system which records on the magnetic tape by separating the color video signal into a carrier chrominance signal and a luminance signal, frequency-modulating the luminance signal, frequency-converting the carrier chrominance signal to a frequency band which is lower than the band of the frequency-modulated luminance signal, multiplexing this frequency-modulated luminance signal and this frequency-converted carrier chrominance signal, and then recording this multiplexed signal on the magnetic tape.

If this recording system uses a high level of the frequency-converted carrier chrominance signal multiplexed with the frequency-modulated luminance signal, the transmission causes deterioration of the S/N ratio of the carrier chrominance signal decreases. However, when the transmission characteristic, the effect on the luminance signal, etc., and like factors are duly taken into consideration, the optimum level of the carrier chrominance signal which can be transmitted is determined. Accordingly, there is also a limit to improving the S/N ratio by merely increasing the level of the carrier chrominance signal.

In general, in a color video signal of the NTSC system, the level of the color burst signal is 6 dB lower than the peak value of the carrier chrominance signal component representing color bars and the like. In this connection, it should be understood that the term "carrier chrominance signal" herein refers collectively to the color burst signal and the carrier chrominance signal component. Therefore, the term "carrier chrominance signal component" designates that part of the carrier chrominance signal which is exclusive of the color burst signal.

Heretofore, the carrier chrominance signal has been transmitted with the level of the carrier chrominance signal component used as it is, and the level of only the color burst signal increased by an increment in the order of 6 dB, up to the optimum level at which transmission is possible. By this method, the color burst signal can be transmitted with a good S/N ratio. The jitter correction is made at the time when the frequency of the converted carrier chrominance signal is returned to its original frequency. As a comprehensive result, the S/N ratio of the carrier chrominance signal increases.

In the above described prior system, however, the level of the carrier chrominance signal component is not high. For this reason, the color image is pale or light. When the level of the carrier chrominance signal is low, the S/N ratio of the carrier chrominance signal component itself is disadvantageously impaired by the transmission.

In an ordinary color video signal, except in the case of a test signal of a color bar or the like, the level of the carrier chrominance signal component is relatively low and is not always the optimum transmissible level of the transmission system.

Accordingly, with this point of view, the present invention contemplates transmission with an increased level of the carrier chrominance signal component within the possible range to increase the S/N ratio of the carrier chrominance signal.

SUMMARY OF THE INVENTION

It is a general object of the present invention to provide a novel and useful system for transmitting carrier chrominance signals of color video signals in a manner which overcomes the above described problems encountered in the prior art.

Another and specific object of the invention is to provide a system for transmitting carrier chrominance signals of color video signals which level-controls and transmitts simultaneously the color burst signal and the carrier chrominance signal component so that the level of either the color burst signal or the carrier chrominance signal component will become the transmissible optimum level of the signal transmission system. By this, the S/N ratio of the carrier chrominance signal is particularly improved, and the carrier chrominance signal can be transmitted with high S/N ratio.

Other objects and further features of the invention will be apparent from the following detailed description when read in conjunction with the accompanying drawings.

BRIEF DESCRIPTION OF THE DRAWINGS

In the drawings:

FIGS. 1(A), 1(B), and 1(C) are respectively graphical diagrams indicating the levels of input color burst signal and carrier chrominance signal component which are to be transmitted;

FIGS. 1(D), 1(E), and 1(F) are respectively graphical diagrams indicating the levels of the color burst signal and carrier chrominance signal component which ar transmitted by a known conventional system;

FIGS. 1(G), 1(H), and 1(I) are respectively graphical diagrams indicating the levels of the color burst signal and carrier chrominance signal component which are transmitted by a system according to the present invention;

FIG. 2 is a block diagram of a recording system, in one embodiment, of the system for transmitting carrier chrominance signals of the color video signal;

DETAILED DESCRIPTION

Figure 3:
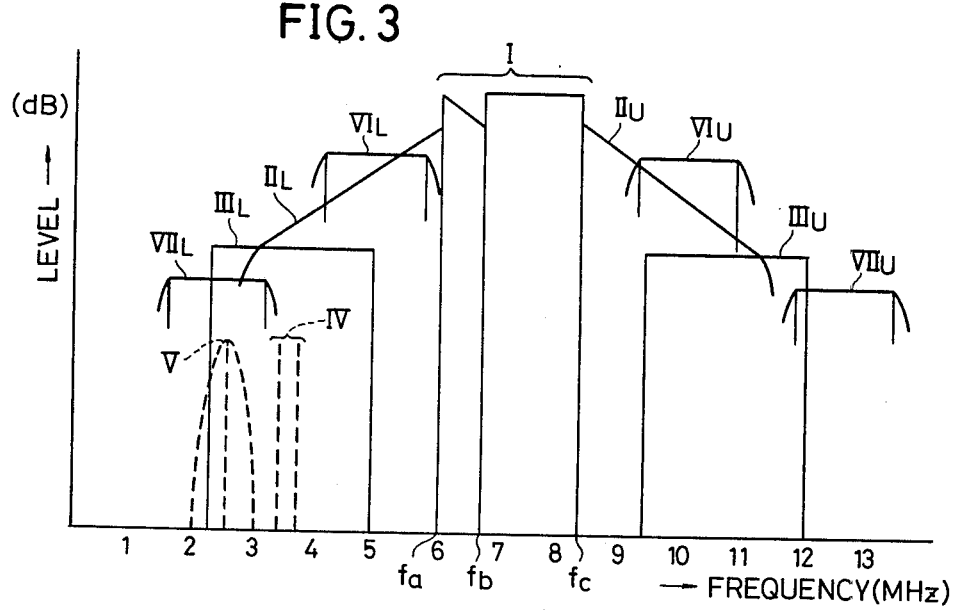
FIG. 3 is a graph indicating the frequency spectrum of signals at various parts of the block diagram illustrated in FIG. 2.

FIG. 1 shows the principle of the level control operation with respect to a color burst signal and a carrier chrominance signal component of a color video signal. With respect to a signal as indicated in FIG. 1(A), for example, the level of a carrier chrominance signal component $C_1$ is higher than that of a color burst signal $B_1$ and is a maximum, as in the case of a color bar signal. Level control in a conventional system is carried out so that a color burst signal $B_{1a}$ will assume a level close to the transmissible optimum level, as indicated in FIG. 1(D). Furthermore, as indicated in FIG. 1(B), the level of an input carrier chrominance signal component $C_2$ is lower to some extent than that of the color burst signal $B_1$, and, also, as indicated in FIG. 1(C), the level of an input carrier chrominance signal component $C_3$ is higher to some extent than that of the color burst signal $B_1$. Level-control in a conventional system is carried out so that, as indicated in FIGS. 1(E) and 1(F), the levels of the carrier chrominance signal components $C_2$ and $C_3$ remain as they are, and only the level of the color burst signal $B_{1a}$ becomes the transmissible optimum level of the transmission system. For this reason, the conventional system has been accompanied by the problems described hereinbefore.

Accordingly, in the present invention, as described hereinafter, the color burst signal and the carrier chrominance signal component are simultaneously level-controlled. The level of one of the signals is caused to be the transmissible optimum level. According to the system of the invention, with respect to the input signal shown in FIG. 1(A), for example, the carrier chrominance signal $C_1$ is already at the maximum level. It is transmitted as it is, as indicated in FIG. 1(G). However, when the level of the input signal is as indicated in FIGS. 1(B) and 1(C), the color burst signal and the carrier chrominance signal component are both level-controlled so that the level of the color burst signal $B_{1a}$ during transmission becomes the transmissible optimum level. Accordingly, the levels of carrier chrominance signal components $C_{2a}$ and $C_{3a}$ are also increased, as indicated in FIGS. 1(H) and 1(I). As a result, the S/N ratio of the transmitted carrier chrominance signal is improved.

In FIG. 2, a description is given of a recording system of one embodiment of a system for transmitting carrier chrominance signal in a color video signal according to the present invention.

Audio signals of two stero channels are introduced through input terminals 11 and 12 and are supplied to audio signal-processing circuits 13 and 14, where they are subjected to signal-processing such as band limitation and automatic noise reduction. The resulting processed signals are then supplied to frequency modulators 15 and 16. There, they frequency modulate carrier waves respectively of frequencies of 3.43 MHz and 3.73 MHz, for example. The resulting frequency-modulated audio signals fA1 and fA2 have frequency deviations of 3.43 MHz±75 KHz and 3.73 MHz±75 KHz and are supplied to a mixer 17.

On the other hand, an NTSC color video signal, for example, introduced from another input terminal 18 is supplied to each of the comb filters 19 and 29, a synchronizing signal separation circuit 21, and a color sub-carrier signal generating circuit 22. The comb filter 19 operates with respect to signals in a frequency band which is higher than 2 MHz where it separates a luminance signal, which is supplied to a low-pass filter 23. This low-pass filter 23 band limits the upper frequency of the luminance signal to approximately 3 MHz. The resulting output luminance signal is supplied to a mixer 24. The synchronizing signal separation circuit 21 separates a synchronizing signal from the luminance signal.

The comb filter 20 produces a carrier chrominance signal having a frequency band of 3.58 MHz±500 KHz, which is then supplied to an automatic chrominance control circuit 25, (referred to as "ACC circuit" hereinafter), which constitutes an essential part of the present invention as will be described hereinafter. The carrier chrominance signal component and the color burst signal are subjected to level amplification control, in the ACC circuit 25. The level of any one of these signals reaches the transmissible optimum level of the signal transmission system, as has been described in conjunction with FIGS. 1(A) through 1(C) and FIGS. 1(G) through 1(I).

The known color sub-carrier generating circuit 22 generates a continuous wave of a frequency fsc (3.579545 MHz in the case of a NTSC system color video signal). The frequency fsc is equal to the color sub-carrier frequency of the carrier chrominance signal, and is generated from a color burst signal in the carrier chrominance signal by using a burst gate pulse signal formed responsive to the synchronizing signal produced the synchronizing signal separation circuit 21. The output signal from the color sub-carrier generating circuit 22 is supplied to a frequency dividing and multiplying circuit 26, where it is frequency divided to 1/7 and multiplied by 12 times. The resulting output signal having a frequency of 6.14 MHz (=3.58 MHz×12/7) is supplied to a frequency converter 27. The carrier chrominance signal from the ACC circuit 25 is supplied to the frequency converter 27, where it is subtracted from the above described frequency signal of 6.14 MHz to get a difference signal in their frequencies. The frequency signal of 6.14 MHz is frequency converted to a lower frequency band of 2.56 MHz ±500 KHz.

This low-band converted carrier chrominance signal is supplied to the mixer 24. There it is multiplexed and inserted, in a common frequency band near the upper frequency limit of the luminance signal, with the luminance signal. The luminance signal is obtained from the comb filter 19 and band limited by the low-pass filter 23. This multiplexed signal passes through a pre-emphasis circuit 28 to the mixer 17. There it is mixed at a suitable level ratio with the frequency-modulated audio signals fA1 and fA2.

In this connection, the carrier frequencies of these frequency-modulated audio signals fA1 and fA2 have values which are higher than the upper frequency limit (3 MHz) of the luminance signal band. There will be no overlapping of bands with the luminance signal which has been separated and band limited. Here, it is desirable that these carrier frequencies have values which are not very high. For example, they may be in the order of 3 to 4 MHz, because of considerations such as relationships with the other recorded and reproduced signals and the facility of recording and reproducing.

The mixed signal output of the mixer 17 is supplied to a frequency modulator 29, where it frequency modulates a carrier. Here, this frequency modulation is carried out so that, for example, the synchronizing signal tip (sync. tip) of the video signal will be 6.0 MHz, the pedestal will be 6.7 MHz, and the white peak will be 8.3 MHz. The output frequency-modulated signal of this frequency modulator 29 is led out as a main information signal, through an output terminal 30, and is then recorded on a recording medium such as a magnetic tape or a rotary disc.

The ACC circuit 25 may be disposed between the frequency converter 27 and the mixer 24.

One example of a frequency spectrum of signals which are recorded in the manner described above is indicated in FIG. 3. In this frequency spectrum, the zone I indicates a carrier frequency deviation band having a band width of 2.3 MHz of the frequency-modulated luminance signal. The frequencies fa, fb, and fc respectively indicate the frequencies of 6 MHz corresponding to the tip of the synchronizing signal, 6.7 MHz corresponding to the pedestal, and 8.3 MHz corresponding to the white peak of the video signal. The zones $II_L$ and $II_U$ respectively indicate the lower side band and the upper side band of the frequency-modulated luminance signal. The zones $III_L$ and $III_U$ respectively indicate the lower side band and the upper side band of signals obtained when the frequency-modulated audio signals $f_{A1}$ and $f_{A2}$ are further frequency modulated. As described hereinbefore, the frequency modulated audio signals $f_{A1}$ and $f_{A2}$ are obtained by frequency modulating audio signals onto carriers of the frequencies 3.43 MHz and 3.73 MHz. These signals are indicated by the zone IV which has a band that is higher than the luminance signal having the upper frequency limit of 3 MHz. The zone V indicates the band of the carrier chrominance signal which is converted to a low frequency band of 2.56 MHz $(=(5/7)fsc)\pm 500$ KHz. First side bands and second side bands are produced by the frequency modulation of this carrier chrominance signal, converted to a low band. These side bands are indicated respectively by the zones $VI_L$ and $VI_U$ and the zones $VII_L$ and $VII_U$. The frequency spectrum indicated by full lines in FIG. 3 is the spectrum of signal which are actually recorded.

Figure 4:
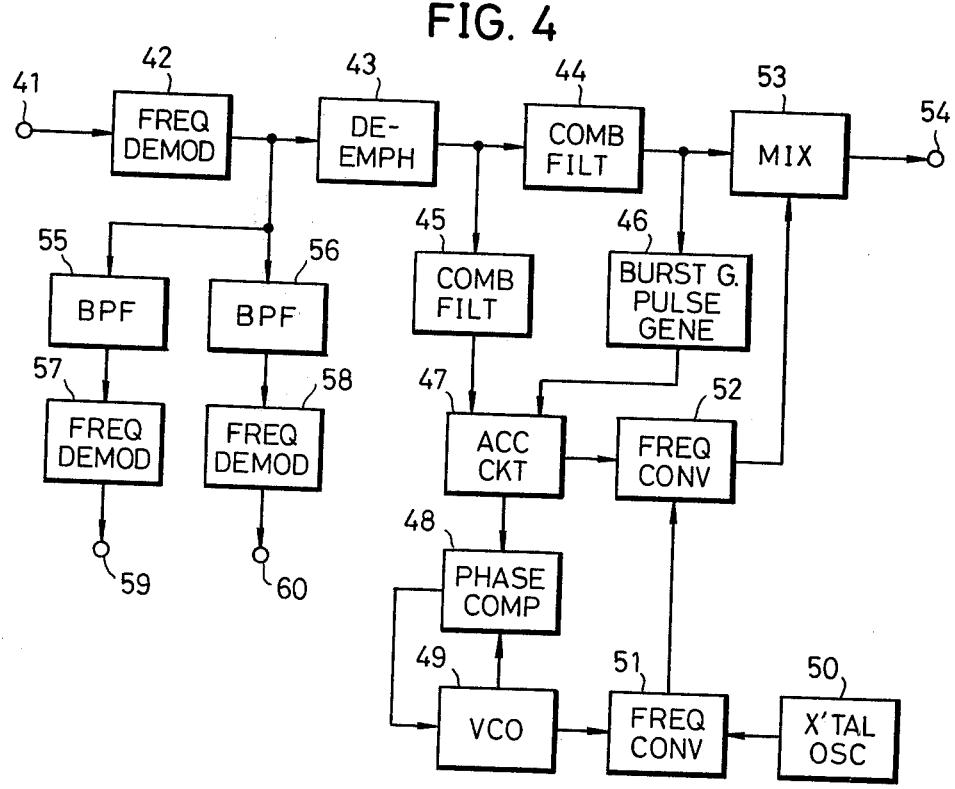
FIG. 4 is a block diagram of a reproducing system cooperating with the recording system illustrated in FIG. 2.

Next, the block diagram of one embodiment of a reproducing system will be described in conjunction with FIG. 4. A signal reproduced from the recorded medium is supplied through an input terminal 41 to a frequency demodulator 42, where it is demodulated. The resulting demodulated signal passes, on one hand, through a deemphasis circuit 43 to each of two comb filters 44 and 45, where a luminance signal and a low-band converted carrier chrominance signal are respectively separated therefrom and led out. The luminance signal from the comb filter 44 is supplied to a burst gate pulse generator 46. The generator 46 separates a synchronizing signal therefrom and generates a gate pulse, based on the separated synchronizing signal. The gate pulse has a phase corresponding to a color burst signal, and is supplied to an ACC circuit 47. The carrier chrominance signal from the comb filter 45 is supplied to the ACC circuit 47. There it is controlled to produce a constant level of the color burst signal in the carrier chrominance signal. The resulting level controlled signal is supplied to a frequency converter 52.

In addition, the color burst signal has a frequency of 2.56 MHz, is gated and led out from the ACC circuit 47, and is supplied to a phase comparator 48. There its phase is compared with the phase of a continuous wave having a frequency of 2.56 MHz, from a voltage controlled oscillator (VCO) 49. The resulting error signal which is led out from the phase comparator 48 controls oscillation of the VCO 49, and produces an output signal in the form of the continuous wave signal of 2.56 MHz in phase synchronism with the color burst signal. The output signal of the VCO 49 is fed to a frequency converter 51, where it is frequency converted with a signal of 3.58 MHz, from a crystal oscillator 50. The frequency-converter output signal has the sum frequency of 6.14 MHz and is supplied to another frequency converter 52.

The frequency converter 52 converts the frequency of signals from the ACC circuit 47 and the frequency converter 51 in order to produce an output signal of a difference frequency. This output signal is a reproduced carrier chrominance signal which has been restored to the original carrier chrominance signal frequency band of the NTSC color television signal, and in which the reproduced jitter component is eliminated. This output signal is fed to a mixer 53. The luminance signal from the comb filter 44 is supplied to the mixer 53, where it is mixed and multiplexed with the above described reproduced carrier chrominance signal. The mixer 53 produces a reproduced NTSC system color television signal, which is led out through an output terminal 54.

The output signal of the demodulator 42 is supplied to band-pass filters 55 and 56 in which the frequency modulated audio signals $f_{A1}$ and $f_{A2}$ are filtered out. The frequency modulated audio signals are demodulated at frequency demodulators 57 and 58, where the demodulated audio signals are derived from output terminals 59 and 60.

In the recording system of the present invention, the carrier chrominance signal component is amplified, transmitted, and recorded in accordance with the signal quantity or the peak value, together with a color burst signal. In the reproducing system, the carrier chrominance signal component is returned to its original level by bringing the level of the color burst signal to a specific constant value. That is, the level of the carrier chrominance signal component is high only at the time of recording, reproducing, and transmitting; thus, the S/N ratio is improved.

In this connection, it is to be understood that the ACC circuit 47 in the reproducing system is not necessarily required in all cases. The ACC operation of an ACC circuit built into a television receiver, in general, may be utilized as a substitute. The ACC circuit 47 may be provided between the frequency converter 52 and the mixer 53.

Next to be described is the ACC circuit 25, which has an important function in the above described basic operation. First, a specific first embodiment of the ACC circuit 25 will be described in conjunction with FIG. 5. A carrier chrominance signal having a frequency band of 3.58 MHz±500 KHz is applied from the comb filter 20 of the recording system illustrated in FIG. 1 to the ACC circuit 25 via an input terminal 71. The carrier chrominance signal comprises a carrier chrominance signal component and a burst signal. This carrier chrominance signal is impedance-converted by a transistor Q1 of emitter-follower configuration and thereafter is level-adjusted by a circuit comprising resistors R1 and R2 and the resistance between the drain and the source of a field-effect transistor (FET) Q2. The resulting signal is further passed through a transistor Q3 of an emitter-follower configuration and a feedback amplifier comprising transistors Q4 and Q5. The signal is led out through a terminal 72.

Here, the above mentioned level adjustment of the carrier chrominance signal is effected by utilizing the resistance between the drain and the source of the FET Q2 which is caused to vary by the gate voltage level thereof. When the ratio of the resistance value of the resistor R1 and the sum of the resistance value of the resistor R2 and the resistance between the drain and the source of the FET Q2 in conductive state is 1:1, a level adjustment in the order of 6 dB is effected.

The carrier chrominance signal which has passed through feedback amplifier is passed through a transistor Q6 of an emitter-follower configuration, an amplifier transistor Q7, and an emitter-follower transistor Q8. This signal is brought to a suitable level, and is conducted to a terminal 73. The carrier chrominance signal thus led to the terminal 73 is passed through a capacitor C1 for DC blocking and is rectified and detected by a half-wave voltage-doubling rectification circuit comprising diodes D1 and D2 and a capacitor C2. The discharge time constant of the capacitor C2 is determined by the capacitance of the capacitor C2 and the resistance of a resistor R3.

A signal obtained from between the two terminals of the capacitor C2 is passed through an integration circuit comprising a resistor R4 and a capacitor C3 and is applied to the noninverting input terminal of an operational amplifier 75. The input offset voltage of this operational amplifier 75 is adjusted by a variable resistor VR1. The output signal of this operational amplifier 75 is applied as a control voltage via a terminal 74 to the gate of the above mentioned FET Q2, where it controls the resistance between the drain and the source thereof. The above described circuit consitutes a closed loop ACC circuit 25.

The time constant of the ACC circuit 25 is determined by the discharging time constant of the capacitor C2 and the time constant of the integration circuit is determined by the product of the capacitor C3 and the resistor R4. The loop gaim of the ACC circuit 25 is determined by the feedback amplifier comprising the transistors Q4 and Q5, the amplifier comprising the transistor Q7, and the operational amplifier 75. The following characteristic of the ACC circuit 25 is determined by the above mentioned loop gain and time constant.

In the present embodiment of the invention, the peak level detection output of the carrier chrominance signal is not held. For this reason, the ACC circuit 25 is controlled by the average value of the carrier chrominance signal component, that is, by the chrominance signal component quantity. Therefore, even if there is a high peak level of the chrominance signal component, its average value will become low if its duration is short. As a result, there is a possibility of the peak level of the level-controlled carrier chrominance signal component exceeding the transmissible optimum level in a short time. However, this is not an obstacle in actual practice. It is preferable to make the following characteristic of the circuit in this case to be relatively slow. It is desirable that the discharging time cnstant of the capacitor C1 be large, for example, of the order of a number of hundreds of milliseconds.

Figure 5:
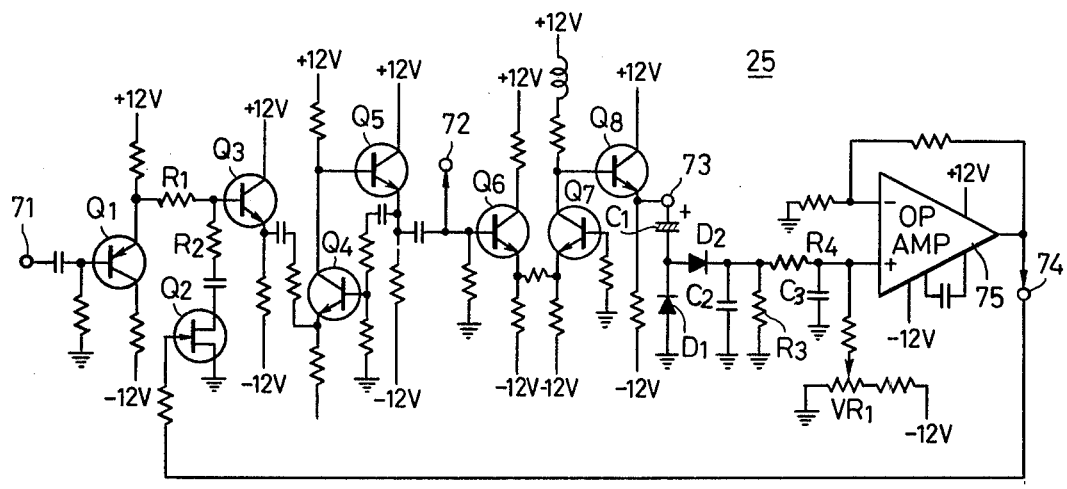
FIGS. 5, 6, and 7 are respectively circuit diagrams of first, second, and third embodiments of the automatic chrominance control circuit, in concrete form, consituting an essential part of the block diagram shown in FIG. 2.

Thus, by the functioning of the ACC circuit 25 of the embodiment of the invention illustrated in FIG. 5, the carrier chrominance signal level is controlled by the average value of the chrominance signal component , and a carrier chrominance signal continually having a peak level close to the transmissible optimum level, determined by the transmission system, is led out through the output terminal 72. In general, the transmissible optimum level is approximately twice the normal color burt signal level. For this reason, if the period in which the average value level of the carrier chrominance signal component is lower than the average value level of the color burst signal continues for a relatively long time, the FET Q2 is placed in its nonconductive state, and the carrier chrominance signal including the color burst signal is amplified so that the color burst signal level will become substantially twice the normal level and is led out as output through the terminal 72.

Figure 6:
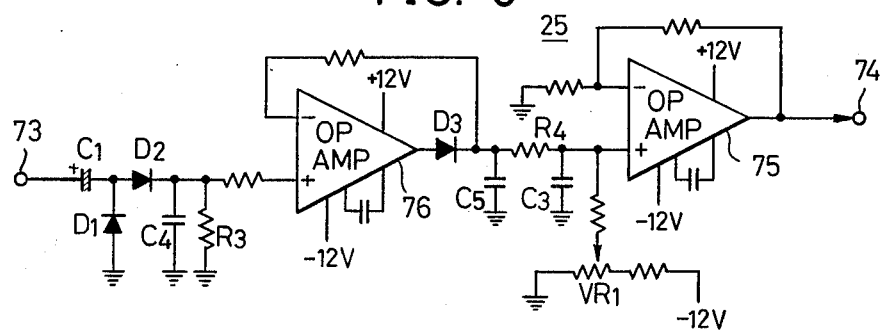

The essential parts of a second embodiment of the inventive ACC circuit 25 are shown in FIG. 6. In FIG. 6, those parts which are the same as or equivalent to corresponding parts in FIG. 5 are designated by like reference numerals. A description of such parts will be omitted in the following description. Furthermore, the circuit in FIG. 6 also has a circuit part corresponding to the circuit between the terminals 71 and 72 in the circuit of FIG. 5, but this circuit part is omitted in FIG. 6. In this second embodiment of the invention, there is a short discharging time constant of a capacitor C4 within a rectifying and detecting circuit comprising the diodes D1 and D2, the capacitor C4, and the resistor R3. For this reason, this rectifying and detecting circuit carries out envelope detection of the carrier chrominance signal. The resulting detected output is applied to the noninverting input terminal of an operational amplifier 76.

A circuit comprising the operational amplifier 76, a diode D3, and a capacitor C5 consitutes a known peak-holding circuit. The reset time consant of this circuit is determined by the product of the capacitance of acapacitor C5 and the resistance of the resistor R4. In the present embodiment of the invention, this reset time constant is selected at a value which is amply long in comparison with one horizontal scanning period (1H period) and, moreover, shorter than one vertical scanning period, being selected at a value of the order of 10 milliseconds.

The output signal of the peak-holding circuit at the two terminals of the capacitor C5 is passed through the integration circuit comprising the resistor R4 and the capacitor C3 and through the operation amplifier 75, led out through the output terminal 74, and applied to the FET Q2 shown in FIG. 5.

According to the present embodiment of the invention, the envelope detection output of the carrier chrominance signal within 1H period is peak held to accomplish level control. Transmission is carried out with the peak level of the carrier chrominance signal within 1H period continually at a level close to the transmissible optimum level. For this reason, the peak level of the carrier chrominance signal does not exceed the transmissible optimum level.

Figure 7:
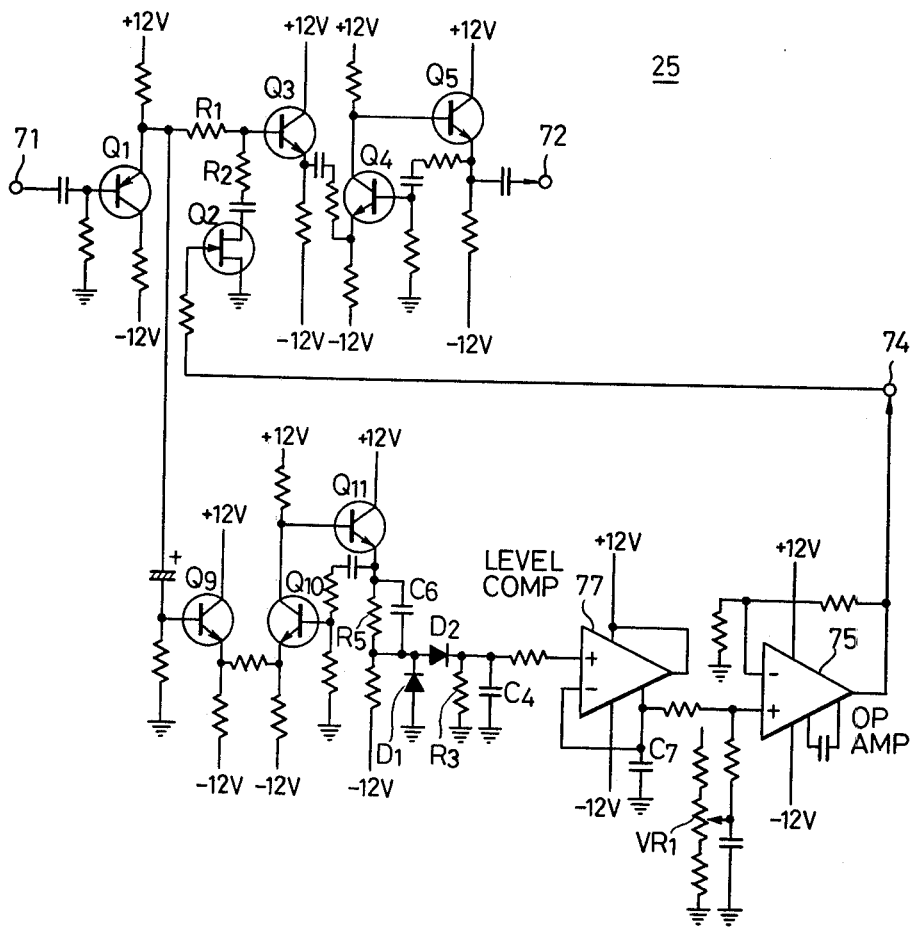

Next, a third embodiment of the ACC circuit 25 according to the invention will be described with reference to FIG. 7. In FIG. 7, those parts which are the same as or equivalent to corresponding parts in FIGS. 5 and 6 are designated by like reference numerals. A detailed description of such parts will not be repeated. A carrier chrominance signal applied to a terminal 71 is impedance-converted by a transistor Q1. Thereafter, this signal, on the one hand, is level-adjusted by a circuit comprising an FET Q2 and resistors R1 and R2 and, on the other hand, is amplified by a feed-back amplifier comprising transistors Q9, Q10, and Q11 and is led out from the emitter of the transistor Q11. This signal is thereafter half-wave and double-voltage rectified by diodes D1 and D2. The signal led out from the emitter of the transistor Q11 is shifted in DC level by passing through a resistor R5 and a capacitor C6 and directly connected to the diode D1. This circuit carries out envelope detection of the carrier chrominance signal together with the circuit of a resistor R3 and a capacitor C4.

This envelope detection output is peak held by a peakholding circuit comprising a level comparator 77. The holding time in this case is determined by the holding capacitor C6 and a load impedance connected thereto. This holding time is selected to be amply longer than 1H period.

This peak-held signal is applied to the noninverting input terminal of an operational amplifier 75, and, further, a DC potential adjusted by a variable resistor VR1 is added theereto, the signal becoming a control signal having a suitable DC level. This output control signal is applied by way of a terminal 74 to the gate of the FET Q2.

In the present embodiment of the invention, differing from the first and second embodiments of the invention illustrated in FIGS. 5 and 6, the ACC operation is not carried out with a closed loop but is carried out with an open loop. For this reason, the operation response speed of this loop circuit is high. The DC level and gain of the above mentioned control signal must be so adjusted that the desired operation is carried out. Since the level variation range is in the order of 6 dB, the adjustment is relatively simple.

Each the ACC circuits of the first, second, and third embodiments set forth above is adapted so that when the peak level of the input carrier chrominance signal component is lower than the color burst signal level as indicated in FIG. 1(B), the color burst signal is amplified or increased approximately 6 dB to a level substantially equal to the transmissible optimum level, as indicated in FIG. 1(H). The carrier chrominance signal component, which has a level less than the transmissible optimum level, is not transmitted as it is, but is amplified in the order of 6 dB together with the color burst signal and is then transmitted. Accordingly, a S/N ratio of the carrier signal component in the transmission system is improved by 6 dB. In addition, since a S/N ratio of the color burst signal is also improved by 6 dB, the jitter correction is carried out in a satisfactory manner.

Moreover, even when the peak level of the input carrier chrominance signal component is larger than that of the color burst signal, as indicated in FIG. 1(C), the peak level of the carrier chrominance signal component is controlled to be the transmissible optimum level. In accompaniment with this, the level of the color burst signal is also increased. Accordingly, the S/N ratio is actually improved on the order of several dB, although being less than 6 dB.

In the above described embodiment, the NTSC system color video signal is employed as the video signal to be transmitted. However, the color video signals such as PAL system or SECAM system color video signal may be employed.

Further, this invention is not limited to these embodiments. Variations and modifications may be made without departing from the scope of the invention.

What is claimed is:

1. A system for transmitting carrier chrominance signals of color video signals comprising:
    a signal transmission system having a transmissible optimum level;
    means for supplying carrier chrominance signals comprising a carrier chrominance signal component and a color burst signal of the color video signal;
    detection means for detecting the level of said supplied carrier chrominance signal to generate a level control signal;
    means for controlling a peak level of said carrier chrominance signal in response to the level control signal from said detection means, the peak level continuously becoming a value substantially equal to the transmissible optimum level of said signal transmission system; and
    means for sending out the level controlled carrier chrominance signal to said signal transmission system.

2. A carrier chrominance signal transmission system as claimed in claim 1 in which said carrier chrominance signal supplying means comprises a comb filter for separating the carrier chrominance signal from the input composite color video signal.

3. A carrier chrominance signal transmission system as claimed in claim 1 in which said detection means detects the average level of said carrier chrominance signal to generate the level control signal.

4. A carrier chrominance signal transmission system as claimed in claim 1 in which said detection means comprises means for envelope detecting said carrier chrominance signal within each horizontal scanning period, and means for peak holding said envelope detected output during the periods sufficiently longer than one horizontal scanning period and shorter than one vertical scanning period.

5. A carrier chrominance signal transmission system as claimed in claim 1 in which said level control means increases the level of said color burst signal and carrier chrominance signal component, the color burst signal level reaching a value substantially equal to the transmissible optimum level of said signal transmission system when the level of the carrier signal component of said carrier chrominance signal is smaller than that of the color burst signal, and the peak level of the carrier chrominance signal component reaching a value substantially equal to the transmissible optimum level of said signal transmission system when the level of the carrier chrominance signal component is larger than that of the color burst signal.

6. A carrier chrominance signal transmission system as claimed in claim 1 which further comprises means for level controlling the entire carrier chrominance signal which has been transmitted by said signal transmission system and has been level controlled in a manner such that the color burst signal of said carrier chrominance signal is a normal level before being subjected to level control.

* * * * *